(No Model.)

D. J. GREENLEAF.
Child's Carriage.

No. 233,503.            Patented Oct. 19, 1880.

Witnesses:
Wm. W. Mortimer
C. H. Isham

Inventor:
D. J. Greenleaf
per F. A. Lehmann
Atty.

UNITED STATES PATENT OFFICE.

DANIEL J. GREENLEAF, OF PORT JERVIS, NEW YORK.

CHILD'S CARRIAGE.

SPECIFICATION forming part of Letters Patent No. 233,503, dated October 19, 1880.

Application filed August 20, 1880. (No model.)

*To all whom it may concern:*

Be it known that I, DANIEL J. GREENLEAF, of Port Jervis, in the county of Orange and State of New York, have invented certain new and useful Improvements in Children's Carriages; and I do hereby declare the following to be a full, clear, and exact description of the invention, such as will enable others skilled in the art to which it pertains to make and use it, reference being had to the accompanying drawings, which form part of this specification.

My invention relates to an improvement in children's carriages and other vehicles; and it consists in pivoting one or both of the bolsters upon their axles and connecting these bolsters together by means of a connecting-rod at each end, so as to form a square frame, and securing across the center of this frame a slotted curved guide, by means of which the reach extending back from the front bolster and the lever which is connected to the handles are connected together and made to move evenly in guiding the carriage.

It further consists in a slotted reach which extends backward from the front axle and a lever which is secured to the handles, and which has its front end connected to the reach, whereby the wheels of the vehicle can be cramped or turned in either direction by means of the handles.

It further consists in providing the front axle with a slotted reach, which extends backward to have the lever which is secured to the handles attached to it, and which reach, where it is desired to use a tongue for drawing the vehicle along, can be detached from the lever, the wheels reversed, and the reach made to project forward so that the tongue can be attached directly to it, as will be more fully described hereinafter.

The object of my invention is to guide children's carriages and other such vehicles by means of a handle, and thus avoid the necessity of raising the front end of the carriage up and swinging it around to move in other than a straight line.

Another object of my invention is to enable the vehicle to be propelled either by means of handles from behind or to have a tongue attached to it in front, so that it may be drawn along, as may be preferred.

Figure 1:
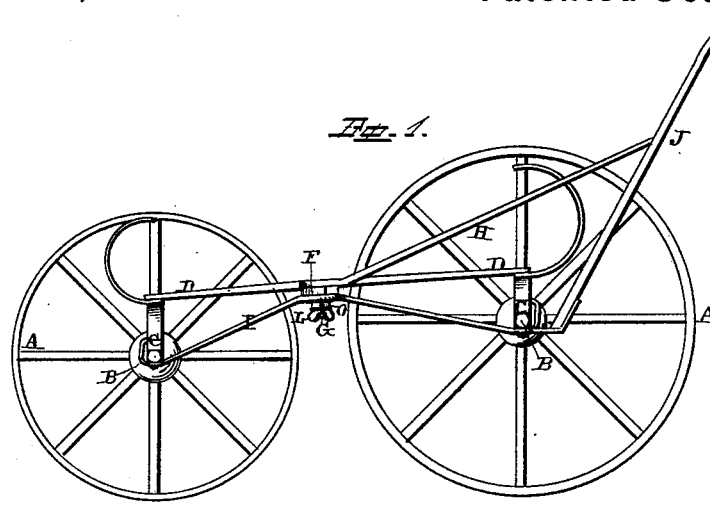
Figure 2:
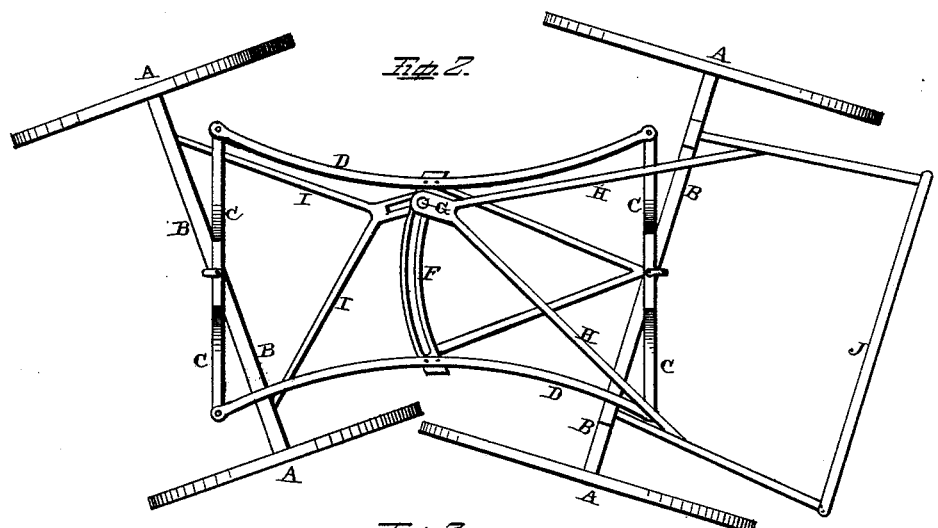
Figure 3:
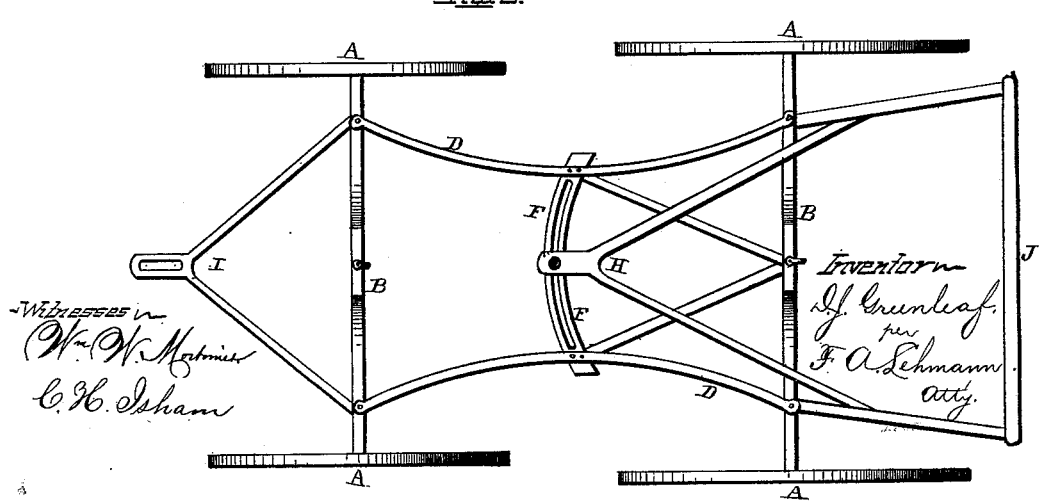

Figure 1 is a side elevation of my invention. Fig. 2 is a plan view of the same. Fig. 3 is a similar view, showing the front wheels reversed, so as to have the reach project forward for the purpose of having a tongue attached to it.

A represents the driving-wheels, and B the axles. Pivoted upon the top of each axle is a bolster, C, which bolsters are connected together at their inner ends by means of the rods D. These rods and bolsters form a rectangular frame, as shown in Fig. 2. If so preferred, one of the bolsters may be secured rigidly in position upon its axle and the other one left free to turn, instead of having them both pivoted, as here shown. Secured to the two connecting-rods D, near their centers, is a curved slotted guide, F, through which passes the clamping-bolt G, which secures the front end of the lever H and the rear end of the slotted reach I together. This lever H is secured to the handles J, which are rigidly secured to the rear axle, and by means of which the reach I is moved from side to side, according to the direction in which it is desired to turn the vehicle. The reach I is rigidly secured to the front axle, and projects back under the guide F, so that the bolt G, which connects it with the lever H, can pass down through it and receive a clamping-nut, L, upon its lower end. The slot through the rear end of this reach enables the reach to be moved from end to end of the guide F as the lever H is moved back and forth. Should it be so desired, by tightening the thumb-screw L either at the center of the guide F or at any other point, the lever and reach can be locked rigidly together, and then the carriage will be rigid, like those now in use, and which will require the front end of the carriage to be raised upward whenever it is desired to turn either in a circle or around a corner.

By means of the construction above described it will be seen that by a simple movement of the handles J the wheels may be cramped in either direction, so that the carriage will run readily around the corner or in a circle without the necessity of raising its front end upward, as is the case where no provision is made for the cramping of the wheels.

Another advantage gained by means of a thumb-nut for locking the carriage in position is, that by locking the wheels in any desired relation to each other the carriage, when pushed forward, will be made to run in a circle of any desired radius, and thus is adapted for use in a house or room, and can be made to run constantly around a table or other object without the slightest trouble on the part of the one pushing the carriage to guide it.

Between the thumb-screw L and the rear end of the reach I is placed a block of rubber, O, which not only prevents all rattling, but allows the parts to be fastened together with a yielding pressure that prevents the parts from being fastened too tightly together or becoming too loose to be easily managed.

Should it be desired to use a tongue for the purpose of drawing the vehicle forward instead of a handle for pushing it, the front axle can be detached from its bolster and then turned around, so that the reach I will extend out beyond the front end of the carriage, and then to this front end of the reach the tongue can be fastened. Should it be desired to use the tongue instead of the handles, the handle and its lever can be removed from the axle so as not to be in the way, or left there for future use.

By thus constructing the various parts, as above described, it will be seen that the carriage can be used either as a rigid carriage, such as is now in general use, or the parts may be flexibly connected together so that the wheels can be cramped by the movement of the handle J, or a tongue can be used, just as the operator prefers.

Should it be desired, a lock, spring-latch, or other fastening device may be applied to the lever H, and which will engage with the guide F at any desired point, so as to lock the lever and reach I in any desired relation to each other. This block or reach may be arranged to operate only at the center of the guide F, or at any other point which may be preferred.

My invention is specially adapted to children's carriages; but it may be used with four-wheeled vehicles of all kinds which are to be propelled either by means of a handle or drawn along by a tongue.

Having thus described my invention, I claim—

1. The combination of a handle, which is secured to the rear axle and provided with a lever, with the front axle, which has a reach projecting backward from it, and which is to be attached to the lever, substantially as described.

2. In a vehicle, the combination of the handle J, provided with the lever H, the bolsters C, connected together by the rods D, slotted guide F, reach I, and a clamping-bolt, substantially as set forth.

3. In a vehicle, the front axle provided with a reach, I, which reach is adapted to be turned so as to project beyond the front end of the vehicle and have the tongue attached to it, substantially as specified.

In testimony that I claim the foregoing I have hereunto set my hand this 11th day of August, 1880.

DANIEL J. GREENLEAF.

Witnesses:
A. VAN ETTEN, Jr.,
JAMES MCDOUGALL.